United States Patent Office 2,775,097
Patented Dec. 25, 1956

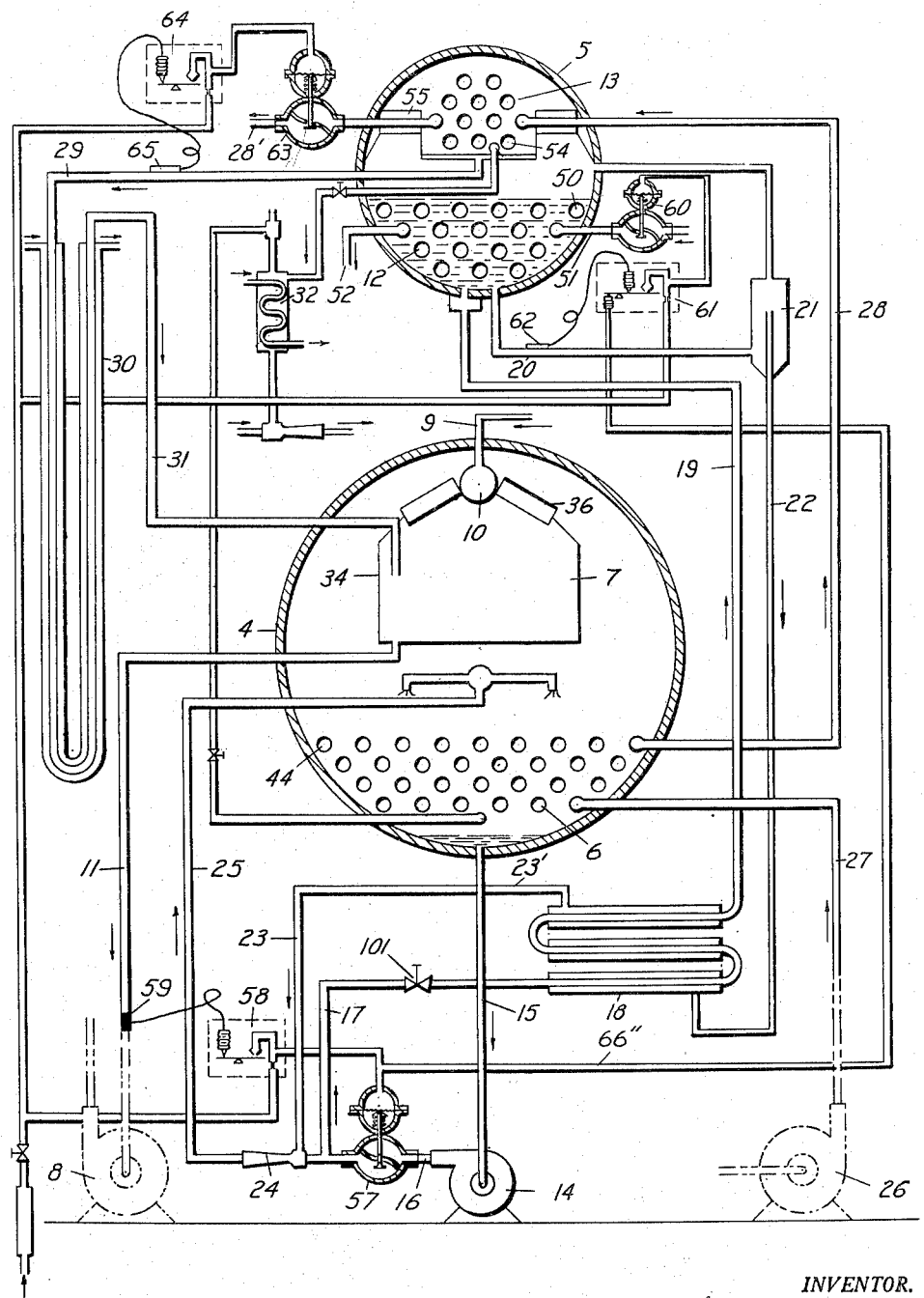

2,775,097
ABSORPTION REFRIGERATION SYSTEMS

Alexis A. Berestneff, Syracuse, N. Y., assignor to Carrier Corporation, Syracuse, N. Y., a corporation of Delaware Original application July 13, 1946, Serial No. 683,387, now Patent No. 2,565,943, dated August 28, 1951. Divided and this application August 3, 1951, Serial No. 240,229

5 Claims. (Cl. 62—5)

This application is a division of my co-pending application, Serial No. 683,387, filed July 13, 1946, now Patent No. 2,565,943, issued August 28, 1951, and relates to a method of operation of an absorption refrigeration system for use in air conditioning applications, or in any application in which temperatures above the freezing temperature of water are desired.

The chief object of the present invention is to provide a method of operation of an absorption refrigeration system permitting more satisfactory performance to be obtained and assuring increased efficiency of the system.

An object is to provide a method of operation of an absorption refrigeration system which includes a salt solution as an absorbent and water as a refrigerant. Other objects of my invention will be readily perceived from the following description.

This invention relates to a method of operation of an absorption refrigeration system including an absorber, an evaporator, a generator and a condenser, in which the steps consist in forwarding a weak solution of absorbent and refrigerant from the absorber to a generator, heating the weak solution in the generator to release refrigerant therefrom, condensing the released refrigerant, forwarding the condensed refrigerant to an evaporator, forwarding strong solution from the generator to the absorber, flash-cooling refrigerant in the evaporator, absorbing the flashed vapor in the solution in the absorber and controlling the flow of solution through the system to vary the capacity of the system.

The attached drawing is a diagrammatic view illustrating the flow of solution through the various elements of the absorption refrigeration system.

Referring to the drawing, there are shown horizontally extending drums or shells 4 and 5. Shell 5 preferably is secured in place above shell 4. Shell 4 encloses a longitudinally extending absorber arrangement 6 and a longitudinally extending evaporator arrangement 7 placed above the absorber 6. Chilled water treated by the system is circulated by a pump 8 through an air conditioning device of any desired type (not shown) and is returned from the air conditioning device to the evaporator 7 through line 9. The chilled water is sprayed in evaporator 7 by a suitable spray arrangement 10, the chilled water being flash-cooled in the evaporator and being drawn from the evaporator through line 11 by pump 8 and again forwarded to the air conditioning device.

Shell 5 encloses a longitudinally extending generator arrangement 12 and a longitudinally extending condenser arrangement 13 placed above the generator 12. Weak solution is withdrawn from absorber 6 by pump 14 through line 15 and is forwarded to the generator 12 through lines 16, 17, heat exchanger 18 and line 19. A restriction 101 may be placed in line 17. Strong solution is withdrawn from generator 12 through line 20, overflow arrangement 21, line 22, heat exchanger 18 and line 23 to an ejector 24 which forwards strong solution through line 25 to the absorber 6. Line 23 is looped at 23' to assure that the heat exchanger does not run dry. The strong solution and weak solution are placed in heat exchange relation in heat exchanger 18. Solution overflow arrangement 21 prevents solution in generator 12 rising above or sinking below a predetermined level.

The term "weak solution" is used herein to define a solution containing a large amount of refrigerant so that the solution is weak in absorbing properties. The term "strong solution" defines a solution which is relatively deficient in refrigerant, and, consequently, a solution which possesses enhanced properties of refrigerant absorption.

Various combinations of refrigerant and absorbent may be used in the present system. A solution consisting of lithium bromide and water is highly satisfactory. Other salt solutions may be used as desired in the system; when the system is operated at high temperatures (above freezing temperatures) a solution of lithium chloride and water or a solution of sodium hydroxide and water, for example, may be used.

A pump 26 passes cooling water through line 27 to the coil of absorber 6 and then forwards the water after its passage through absorber 6 through line 28 to the coil of condenser 13; in some cases, if desired, the direction of flow may be reversed, the cooling water being first directed to the coil of condenser 13 and then to the coil of absorber 6. After passage through the coil of condenser 13, the water is discharged or, if desired, may be re-used as in the case of a cooling tower.

A line 29 withdraws vapor condensate from the condenser 13, the vapor condensate passing through a pre-cooler assembly 30, and then being returned through line 31 to the evaporator 7. A suitable purge arrangement 32 is provided to purge condenser 13 and absorber 6 of air or other non-condensible gases. Purge 32 may operate intermittently or continuously, as desired.

Vapor formed by flash-cooling of refrigerant in evaporator 7 flows upward in evaporator 7, passes through eliminators 36, and then flows downward exteriorly of and surrounding compartment 34 and is absorbed by the strong solution sprayed over the tubes 44 of the absorber to aid in rapid absorption of the refrigerant.

Generator 12 is heated to evaporate the refrigerant from the weak solution by means of steam directed through the tubes 50 from steam line 51, the steam condensate being withdrawn from tubes 50 through steam line 52.

In the operation of the generator, refrigerant in the weak solution is boiled out and passes upwardly in shell 5 and is condensed in condenser 13, condensate being removed from the condenser 13 through line 29, to pre-cooler 30 and then being returned to evaporator 7.

It is desirable that the capacity be changed immediately upon a change in load to attain most satisfactory operation. The temperature of the chilled water may be used to indicate a change in load, since a decrease in the temperature thereof from a predetermined point indicates that the load imposed upon the system has decreased. If the temperature of the chilled water leaving the evaporator decreases, the capacity of the system may be decreased accordingly by throttling the volume of strong solution passing to the absorber.

For this purpose a valve 57 is placed in line 16 between ejector 24 and pump 14 at a point between pump 14 and the juncture of line 17 with line 16. Valve 57 is actuated by a pneumatic control 58 operated by a bulb 59 placed in or adjacent line 11. As the temperature of chilled water passing through line 11 decreases, fluid in bulb 59 contracts and control 58, in accordance therewith, tends to move valve 57 toward a closed position, thereby decreasing the amount of weak solution being forwarded to generator 12 through lines 17 and 19 proportionately to the decrease in the temperature of the chilled water. Movement of valve 57 toward a closed position also decreases proportionately the amount of weak solution passing to ejector 24. The reduction in the amount of weak solution passing to ejector 24 reduces the velocity of such solution through the nozzle of the ejector and, consequently, a smaller quantity of strong solution is entrained or induced from line 23. The throttling action of valve 57 accordingly reduces the amount of solution passing to and returning from generator 12 and, likewise, reduces the amount of solution passing to ejector 24 and forwarded to absorber 6. The capacity of absorber 6 is controlled by the decreased wetting action provided by the reduction in total solution and by the reduction in strong solution therein, in accordance with the load imposed on the system.

A valve 60 is provided in steam line 51 to control the amount of steam passing into the tubes of generator 12 in accordance with the load imposed upon the system. Valve 60 is actuated by control 61 operated, in turn, by bulb 62 placed in or adjacent line 20.

The amount of condensing water passing through condenser 13 is controlled by means of a valve 63 placed in line 28', actuated by a thermostat 64, controlled by a bulb 65 placed in or adjacent the vapor condensate line 29.

The concentration of the strong solution leaving generator 12 depends upon the temperature and pressure of solution in shell 5. Pressure in shell 5 may be maintained indirectly through the control of condenser 13. Pressure in shell 5 is dependent upon the condensing temperature of condenser 13. As the temperature of the vapor condensate in line 29 decreases, it indicates that too large an amount of condensing water is being permitted to flow through the coil of condenser 13. Bulb 65 through thermostat 64 throttles valve 63 to decrease the amount of condensing water flowing through the coil of condenser 13. The condensing temperature may be controlled by regulating the temperature of the cooling water within desired limits.

As the load reduces and the amount of solution passing from the generator reduces, the temperature of the strong solution in line 20 increases. Bulb 62, responding to the temperature of the solution in line 20 through control 61, actuates valve 60 to move toward a closed position to throttle the amount of steam passing through the coil of generator 12 until it balances with the new load. By means of valves 60 and 63 temperature and pressure of the solution in shell 5 is controlled and, thereby, indirectly provides control of concentration of solution.

While generally it is desirable to maintain the concentration of the solution constant in accordance with pressure and temperature conditions in shell 5, in some cases it may be desirable to decrease the concentration of the solution at partial load. For this purpose a reset control may be provided, to change the control point of 61. Control 61 may then be actuated by air pressure through line 66" connected to the air line which operates valve 57. The reset control so provided serves to change the control point of control 61. As air pressure in line 66" decreases, it resets the control point of control 61 in accordance with the desired temperature of the solution leaving the generator and pressure in shell 5 thereby indirectly decreasing the concentration of solution to the desired degree.

The present invention provides a method of operation of an absorption refrigeration system to provide increased efficiency and lower cost. The method of operation permits adequate control of capacity, temperature of chilled water, flow of and concentration of solution, flow of chilled water and flow of condensing water.

The present invention varies the capacity of the system by varying the flow of solution through the system. Preferably, flow of solution through the system is regulated in response to the temperature of chilled refrigerant leaving the evaporator, since such temperature serves as an indication of the load imposed upon the system.

While I have described a preferred embodiment of my invention, it will be understood my invention is not limited thereto, since it may be otherwise embodied within the scope of the following claims.

I claim:

1. In the method of operation of an absorption refrigeration system including an absorber, an evaporator, a generator and a condenser, the steps which consist in forwarding a weak solution of absorbent and refrigerant from the absorber to the generator, heating the weak solution in the generator to release refrigerant therefrom, condensing the released refrigerant, forwarding the condensed refrigerant to the evaporator, forwarding strong solution from the generator to the absorber, passing a heating medium through the generator in heat exchange medium to the generator in response to the temperature relation with solution therein, regulating flow of heating of strong solution leaving the generator, flash-cooling refrigerant in the evaporator, absorbing the flashed vapor in the solution in the absorber, purging non-condensible gases from the condenser and the absorber and regulating the flow of solution through the system in response to the temperature of flash cooled refrigerant leaving the evaporator.

2. In the method of operation of an absorption refrigeration system including an absorber, an evaporator, a generator and a condenser, the steps which consist in forwarding a weak solution of absorbent and refrigerant from the absorber to the generator, heating the weak solution in the generator to release refrigerant therefrom, condensing the released refrigerant, forwarding the condensed refrigerant to the evaporator, forwarding strong solution from the generator to the absorber, flash-cooling refrigerant in the evaporator, absorbing the flashed vapor in the solution in the absorber, controlling the flow of solution through the system to vary the capacity of the system, and utilizing a stream of weak solution under pressure to withdraw a second stream of strong solution from the generator and to return the strong solution to the absorber.

3. A method of operation of an absorption refrigeration system according to claim 2 in which the flow of cooling medium through the condenser is varied to condense refrigerant vapor from the generator.

4. In the method of operation of an absorption refrigeration system including an absorber, an evaporator, a generator and a condenser, the steps which consist in forwarding a weak solution of absorbent and refrigerant from the absorber to the generator, heating the weak solution in the generator to release refrigerant therefrom, condensing the released refrigerant, forwarding the condensed refrigerant to the evaporator, forwarding strong solution from the generator to the absorber, flash cooling refrigerant in the evaporator, absorbing the flashed vapor in the solution in the absorber, controlling the flow of solution through the system in response to the temperature of flash cooled refrigerant leaving the evaporator, passing a heading medium through the generator in heat exchange relation with solution therein, and regulating flow of heating medium to the generator in response to the temperature of strong solution leaving the generator.

5. A method of operation of a refrigeration system according to claim 4 which includes the steps of passing a cooling medium through the condenser in heat exchange relation with refrigerant vapor therein to condense the same, and regulating passage of cooling medium through the condenser in response to the temperature of condensate leaving the condenser.

(References on following page)

References Cited in the file of this patent

UNITED STATES PATENTS

| | | |
|---|---|---|
| 942,367 | Dyer | Dec. 7, 1909 |
| 2,210,609 | Ullstrand | Aug. 6, 1940 |
| 2,319,601 | Hedlund | May 18, 1943 |
| 2,480,497 | Meyer | Aug. 30, 1949 |
| 2,502,069 | Andersson | Mar. 28, 1950 |
| 2,502,104 | Reid | Mar. 28, 1950 |
| 2,518,202 | Thomas | Aug. 8, 1950 |
| 2,565,838 | Berestneff | Aug. 28, 1951 |
| 2,565,943 | Berestneff | Aug. 28, 1951 |
| 2,582,838 | Leonard | Jan. 15, 1952 |